United States Patent [19]

van der Meer

[11] Patent Number: 5,055,494

[45] Date of Patent: Oct. 8, 1991

[54] METHOD OF IMPROVING THE RESISTANCE OF POLYPHENYLENE ETHER ARTICLES TO SUNLIGHT, AND ARTICLES IMPROVED BY THIS METHOD

[75] Inventor: Roelof van der Meer, Halsteren, Netherlands

[73] Assignee: General Electric Co., Selkirk, N.Y.

[21] Appl. No.: 644,757

[22] Filed: Jan. 24, 1991

Related U.S. Application Data

[63] Continuation of Ser. No. 250,898, Sep. 29, 1988, abandoned.

[30] Foreign Application Priority Data

Oct. 1, 1987 [NL] Netherlands ............... 8702343

[51] Int. Cl.$^5$ .................................. C08J 9/26
[52] U.S. Cl. ................................ 521/61; 521/62; 521/134; 521/138; 521/139
[58] Field of Search .............. 521/61, 62, 134, 138, 521/139

[56] References Cited

U.S. PATENT DOCUMENTS 4,721,732 1/1988 Dubrow et al. ............... 521/62
4,792,492 12/1988 Lee ............................ 428/412

Primary Examiner—Morton Foelak
Attorney, Agent, or Firm—Francis T. Coppa

[57] ABSTRACT

The resistance to discoloring of formed articles from polymer mixtures which comprise a polyphenylene ether and at least a second polymer can be improved by treating the surface of the formed articles with a solvent. The solvent is chosen so that the polyphenylene ether does dissolve therein, but the second polymer does not dissolve therein.

8 Claims, No Drawings

METHOD OF IMPROVING THE RESISTANCE OF POLYPHENYLENE ETHER ARTICLES TO SUNLIGHT, AND ARTICLES IMPROVED BY THIS METHOD

This is a continuation of application Ser. No. 07/250,898, filed Sep. 29, 1988 now abandoned.

The invention relates to a method of improving the resistance to sunlight of articles formed from polymer mixtures which comprise a polyphenylene ether and at least a second polymer.

The invention also relates to the articles thus obtained.

It is generally known that articles formed from polymer mixtures which comprise a polyphenylene ether discolour when exposed to sunlight. This discoloration also occurs in articles formed from polymer mixtures which, in addition to a polyphenylene ether, comprise a second polymer.

In practice various measures are used to solve this problem. It has been suggested to incorporate stabilisers in the polymer mixture. This measure results in an improvement of the resistance to sunlight. Sometimes the formed articles are provided with a lacquer layer which provides protection.

The invention provides a further solution to the above mentioned problem.

The method according to the invention is characterised in that the surface of the formed article is treated with a solvent for a sufficiently long period of time to remove at least a part of the polyphenylene ether, the solvent being chosen to be so that the second polymer does not dissolve therein.

It has been found that articles having a considerably improved resistance to sunlight can be obtained by means of the method described hereinbefore.

The articles which are treated according to the method of the invention have been manufactured entirely or partly from polymer mixtures. They may be manufactured, for example, by injection moulding or by extrusion from the polymer mixture.

The polymer mixture from which the articles have been manufactured comprises at least a polyphenylene ether and a second polymer. The second polymer is generally chosen to be so that it satisfies the following two conditions:

a. it must have a resistance to sunlight better than that of polyphenylene ethers, and b. it must be possible to find a solvent or solvents in which the second polymer is less readily soluble than the polyphenylene ether.

Various polymer mixtures are known which comprise a polyphenylene ether. In the method according to this invention, especially suitable polymer mixtures which are known per se are those which comprises, in addition to a polyphenylene ether, a polyamide, a polyolefin, a polyalkylene terephthalate, for example, polybutylene terephthalate and polyethylene terephthalate, a polyether imide, a polyacetal and/or a polyolefin. These polymer mixtures generally comprise 1–80% by weight, preferably 1–70% by weight, of polyphenylene ether and 99–20% by weight, preferably 99–30% by weight, of a second polymer. Even more preferably, the content of the second polymer is chosen between the limits mentioned hereinbefore so that the second polymer in the polymer mixture forms the continuous phase in which the polyphenylene ether is dispersed.

The way in which the method according to the invention is performed is not critical: for example, the formed article may be immersed for some time in the solvent chosen. It is also possible to spray solvent on the surface of the formed article.

The solvent may be a mixture of one or more organic liquids. It is only of importance that the polyphenylene ether dissolves in the solvent better than the second polymer.

Examples of solvents used in the treatment of articles formed from polymer mixtures which comprise a polyphenylene ether are aromatic hydrocarbons, for example, benzene, toluene, xylene, petrol, halogenated hydrocarbons, for example, methylene chloride, chloroform and trichloroethylene.

The articles which are treated according to the method of the invention have been manufactured from polymer mixtures which comprise a polyphenylene ether.

Polyphenylene ethers are compounds known per se. For this purpose, reference may be made to numerous patent publications. A survey of suitable polyphenylene ethers is described, for example, in WO 87/00540.

Polymer mixtures which, in addition to a polyphenylene ether, comprise a second polymer and which are suitable for the manufacture of articles which can be treated according to the method of the invention are known per se. By way of example, reference may be made to WO 87/00540 in which polymer mixtures are described which comprise a polyamide as the second polymer; to WO 87/00850 in which polymer mixtures are described which comprise a polyester as the second polymer; to U.S. Pat. No. 4,431,779 in which polymer mixtures are described which comprise a polyether imide as the second polymer, and to EP-A-133487 in which polymer mixtures are described which comprise a polyolefin as the second polymer.

The articles may also be manufactured from polymer mixtures which comprise more than two polymers. Examples of such polymer mixtures are polymer mixtures which comprise a polyphenylene ether, one or more of the polymers mentioned hereinbefore, and polymers or copolymers derived from vinylaromatic monomers. Such polymer mixtures are described, for example, in EP-A-0046040, EP-A-0221341 and EP-A-0222129.

The invention will now be described in greater detail with reference to the ensuing specific example.

EXAMPLE I

A polymer mixture was prepared from 49 parts by weight of polyphenylene ether (a poly (2,6-dimethyl-1,4-phenylene) ether with an intrinsic viscosity measured in $CHCl_3$ at 25° C. of 46 dl/g), 41 parts by weight of polyamide 6.6 having a number-averaged molecular weight $M_n$ of 20,000 and a viscosity index measured according to ISO R307 (0.5 g of polyamide dissolved in 100 g of 90% formic acid at 25° C.) of 135 ml/g and a o moisture content of approximately 0.20% by weight, 10 parts by weight of a non-hydrogenated styrene-butadienestyrene block copolymer, 0.7 parts by weight of citric acid-1-hydrate, and 4.4 parts by weight of pigments (of which 4.0 parts by weight of $TiO_2$).

The said constituents were processed in a double-blade extruder to form a polymer mixture in pellet form.

A large plate (thickness approximately 3 mm) was manufactured from the resulting polymer mixture by injection moulding. Two small samples were sawn from the plate.

The first sample (sample A) was immersed for 6 minutes in a 50/50 mixture of toluene/isooctane ("fuel C"). The second sample (sample B) was not treated.

Both samples were exposed on one side (in the Netherlands) to natural sunlight behind a glass plate for 30 months.

After termination of the test period, the yellowness index and the discolouring according to CIELAB (DIN 6174) of both samples were determined. The discolouring (delta $E_{ab}*$) was determined in comparison with the colour of the side of the same sample not exposed to sunlight. The found and calculated values are recorded hereinafter:

| Sample | Yellowness index | Delta $E_{ab}*$ |
| --- | --- | --- |
| A. unexposed side | 20.9 | |
| exposed side | 35.6 | 9.9 |
| B. unexposed side | 20.2 | |
| exposed side | 53.0 | 22.5 |

It may be seen from the results obtained that the discolouring of the treated sample is less than that of the non-treated sample. In particular, as appears from the yellowness index, less yellowing occurs.

EXAMPLE II

In the same manner as described in example I, two samples C and D were manufactured from a polymer mixture consisting of 36 parts by weight of the same polyphenylene ether, 0.7 parts by weight of citric acid-1-hydrate, 19 parts by weight of high-impact polystyrene, 8 parts by weight of the same styrene-butadiene-styrene block copolymer, 37 parts by weight of the same polyamide-6,6 and 4.4 parts by weight of pigments (of which 4.0 parts by weight of $TiO_2$).

The samples C and D were treated and exposed to light in the same manner as described in Example I. The results obtained were as follows.

| Sample | Yellowness index | Delta $E_{ab}*$ |
| --- | --- | --- |
| C. unexposed side | 17.5 | |
| exposed side | 25.0 | 4.8 |
| D. unexposed side | 17.4 | |
| exposed side | 40.8 | 15.4 |

In this case also the method according to the invention resulted in an improvement of the colourfastness.

What is claimed is:

1. A method of improving the resistance to sunlight of articles formed from polymer mixtures which comprise a polyphenylene ether and at least one second polymer selected from the group consisting of a polyamide, a polyolefin, a polyester, a polyetherimide, a polyacetal, a styrene-butadienestyrene block copolymer, and mixtures thereof;
   wherein the surface of the formed article is treated with a solvent for a period of time sufficiently long to remove at least a portion of the polyphenylene ether, the solvent being chosen so that the second polymer does not dissolve therein.

2. The method of claim 1 wherein the polyester comprises a polyalkylene terephthalate.

3. The method of claim 2 wherein the polyalkylene terephthalate is selected from the group consisting of polybutylene terephthalate, polyethylene terephthalate, and mixtures thereof.

4. The method of claim 1 wherein the second polymer has a resistance to sunlight better than that of the polyphenylene ether.

5. The method of claim 1 wherein the solvent is an aromatic hydrocarbon.

6. The method of claim 1 wherein the solvent is a halogenated hydrocarbon.

7. The method of claim 1 wherein the solvent is selected from the group consisting of benzene, toluene, xylene, petrol, methylene chloride, chloroform, trichloroethylene, isooctane and mixtures thereof.

8. The method of claim 1 wherein the solvent component is a 50/50 mixture of toluene/isooctane.

* * * * *